US012798067B2

(12) United States Patent
Sun et al.

(10) Patent No.: US 12,798,067 B2
(45) Date of Patent: Nov. 17, 2026

(54) NAIL GUN

(71) Applicant: Nanjing Chervon Industry Co., Ltd., Nanjing (CN)

(72) Inventors: Guangcheng Sun, Nanjing (CN); Wenjie Yang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 19/022,554

(22) Filed: Jan. 15, 2025

(65) Prior Publication Data

US 2025/0153326 A1 May 15, 2025

Related U.S. Application Data

(63) Continuation of application No. PCT/CN2024/087502, filed on Apr. 12, 2024.

(30) Foreign Application Priority Data

May 5, 2023 (CN) ......................... 202310501529.0
Jan. 29, 2024 (CN) ......................... 202410123126.1

(51) Int. Cl.
*B25C 1/04* (2006.01)
*B25C 1/00* (2006.01)
*B25C 1/06* (2006.01)

(52) U.S. Cl.
CPC .............. *B25C 1/047* (2013.01); *B25C 1/005* (2013.01); *B25C 1/06* (2013.01)

(58) Field of Classification Search
CPC .............. B25C 1/04; B25C 1/047; B25C 1/06
(Continued)

(56) References Cited

U.S. PATENT DOCUMENTS 3,056,226 A * 10/1962 Hubbard ................. F41A 19/13
42/69.02
10,632,600 B2 * 4/2020 Pomeroy ................... B25C 1/06
(Continued)

FOREIGN PATENT DOCUMENTS

CN 108656026 A * 10/2018 ............... B25C 1/06
CN 209648625 U 11/2019
(Continued)

OTHER PUBLICATIONS

International Search Report and Written Opinion of international application No. PCT/CN24/87502, dated Nov. 14, 2024, 7 pp.
(Continued)

*Primary Examiner* — Shelley M Self
*Assistant Examiner* — Patrick B Fry
(74) *Attorney, Agent, or Firm* — Greenberg Traurig, LLP

(57) ABSTRACT

A nail gun includes a firing assembly including a firing pin and a first piston; a cylinder assembly including a cylinder, a second piston, and an end cap, where the end cap is connected to the front end of the cylinder; a housing; a motor; and a transmission assembly configured to drive the second piston. The end cap includes a first end cap portion connected to the housing and including a support portion for supporting the transmission assembly; and a second end cap portion movably connected to the first end cap portion. The first end cap portion is provided with a first opening, and the second end cap portion is connected to the first opening. When at least part of the second end cap portion moves away from the first end cap portion, the first opening is exposed to allow the firing assembly to be disengaged from the cylinder assembly.

19 Claims, 12 Drawing Sheets

(58) Field of Classification Search
USPC .................................................. 227/130, 131
See application file for complete search history.

(56) References Cited

U.S. PATENT DOCUMENTS

| | | | | |
|---|---|---|---|---|
| 2012/0160889 | A1* | 6/2012 | Tanji | B25C 1/043 227/142 |
| 2015/0053736 | A1 | 2/2015 | Pomeroy | |

FOREIGN PATENT DOCUMENTS

| | | | |
|---|---|---|---|
| CN | 210550947 | U | 5/2020 |
| CN | 213532465 | U | 6/2021 |
| CN | 217394815 | U | 9/2022 |
| CN | 110900524 | A | 7/2023 |
| CN | 111843934 | A | 5/2024 |
| JP | 2012187640 | A | 10/2012 |
| JP | 2017119330 | A | 7/2017 |
| RU | 192013 | U1 | 8/2019 |

OTHER PUBLICATIONS

Extended Search Report from European application No. 24802694.0, dated Feb. 18, 2026, 5 pp.

* cited by examiner

NAIL GUN

RELATED APPLICATION INFORMATION

This application is a continuation of International Application Number PCT/CN2024/087502, filed on Apr. 12, 2024, through which this application also claims the benefit under 35 U.S.C. § 119(a) of Chinese Patent Application No. 202310501529.0, filed on May 5, 2023, and Chinese Patent Application No. 202410123126.1, filed Jan. 29, 2024, which applications are incorporated herein by reference in their entireties.

TECHNICAL FIELD

The present application relates to the field of power tools and, for example, to a nail gun.

BACKGROUND

A nail gun in the related art is a commonly used fastening tool. In an existing nail gun, a motor is connected to a gear and drives the gear to rotate. The gear is connected to a crank and a connecting rod, and the crank and the connecting rod drive a piston to reciprocate in a cylinder so that a firing pin moves during rotation of the gear. The firing pin drives a fastener into a workpiece. If the firing pin is damaged or broken during use, a user needs to disassemble the nail gun to replace the firing pin.

This part provides background information related to the present application, and the background information is not necessarily the existing art.

SUMMARY

A nail gun includes a firing assembly including a firing pin configured to strike a fastener and a first piston for mounting the firing pin; a cylinder assembly including a cylinder, a second piston, and an end cap, where the cylinder forms a chamber configured to accommodate the first piston and the second piston, and the end cap is connected to the front end of the cylinder; a housing configured to support the cylinder assembly; a motor disposed in the housing; and a transmission assembly configured to drive the second piston to move in the cylinder. The end cap includes a first end cap portion connected to the housing and including a support portion for supporting the transmission assembly; and a second end cap portion movably connected to the first end cap portion. The first end cap portion is provided with a first opening, and the second end cap portion is connected to the first opening. When at least part of the second end cap portion moves away from the first end cap portion, the first opening is exposed to allow the firing assembly to be disengaged from the cylinder assembly.

In some examples, the nail gun includes a connector for detachably connecting the second end cap portion to the first end cap portion.

In some examples, the nail gun includes a nail holder for guiding the firing pin to move along a first straight line, the second end cap portion supports at least part of the nail holder, and when the at least part of the second end cap portion moves away from the first end cap portion, the nail holder moves away from the first end cap portion along with the at least part of the second end cap portion.

In some examples, the nail gun includes a magazine for accommodating the fastener, the magazine supports at least part of the nail holder, and when the at least part of the second end cap portion moves away from the first end cap portion, the magazine moves away from the first end cap portion along with the at least part of the second end cap portion.

In some examples, the firing pin moves basically along a first straight line, a cross section of the first opening is basically circular, a cross section of the first piston is basically circular, and the center of the cross section of the first piston and the center of the cross section of the first opening are basically located on the first straight line.

In some examples, the second end cap portion is provided with a second opening, a cross section of the second opening is basically circular, and the center of the cross section of the second opening is basically located on the first straight line.

In some examples, the chamber includes a first chamber for the first piston to reciprocate in and a second chamber for the second piston to reciprocate in.

In some examples, the end cap includes a ventilation portion, and the first chamber, the ventilation portion, and the second chamber communicate in sequence so that when the first piston moves towards the end cap, at least part of air in the first chamber flows towards the second chamber.

In some examples, the nail gun includes a depth adjustment device configured to adjust a stroke length of the first piston and including a buffer and an operating member, where when the operating member is rotated, the buffer moves along an axial direction of the first chamber.

In some examples, the first end cap portion includes a first ventilation portion, the second end cap portion includes a second ventilation portion, and the first ventilation portion and the second ventilation portion jointly constitute the ventilation portion.

In some examples, the firing pin includes a firing pin body and a firing pin head, the firing pin head is located at an end of the firing pin body facing away from the first piston, and the firing pin head is detachably connected to the firing pin body.

In some examples, at least part of the second end cap portion, at least part of the first end cap portion, and at least part of the transmission assembly are arranged in sequence from top to bottom.

In some examples, the first end cap portion includes a first accommodation portion for accommodating at least part of the transmission assembly.

In some examples, a maximum dimension of the second end cap portion in an up and down direction is less than a maximum dimension of the first end cap portion in the up and down direction.

In some examples, a maximum dimension of the second end cap portion in a left and right direction is less than a maximum dimension of the first end cap portion in the left and right direction.

A nail gun includes a firing assembly including a firing pin configured to strike a fastener and a first piston for mounting the firing pin; a cylinder assembly including a cylinder, a second piston, and an end cap, where the cylinder forms a chamber configured to accommodate the first piston and the second piston, and the end cap is connected to the front end of the cylinder; and a housing configured to support the cylinder assembly. The end cap includes a first end cap portion connected to the housing; and a second end cap portion movably connected to the first end cap portion. The first end cap portion is provided with a first opening, and the second end cap portion is connected to the first opening. When at least part of the second end cap portion moves away from the first end cap portion, the first opening is exposed to allow the firing assembly to be disengaged from the cylinder assembly.

A nail gun includes a firing assembly including a firing pin configured to strike a fastener and a first piston for mounting the firing pin; a cylinder assembly including a cylinder, a second piston, and an end cap, where the cylinder forms a chamber configured to accommodate the first piston and the second piston, and the end cap is connected to the front end of the cylinder; and a transmission assembly configured to drive the second piston to move in the cylinder. The end cap includes a first end cap portion for supporting the transmission assembly; and a second end cap portion movably connected to the first end cap portion. The first end cap portion is provided with a first opening, and the second end cap portion is connected to the first opening. When at least part of the second end cap portion moves away from the first end cap portion, the first opening is exposed to allow the firing assembly to be disengaged from the cylinder assembly.

DETAILED DESCRIPTION

Figure 1:
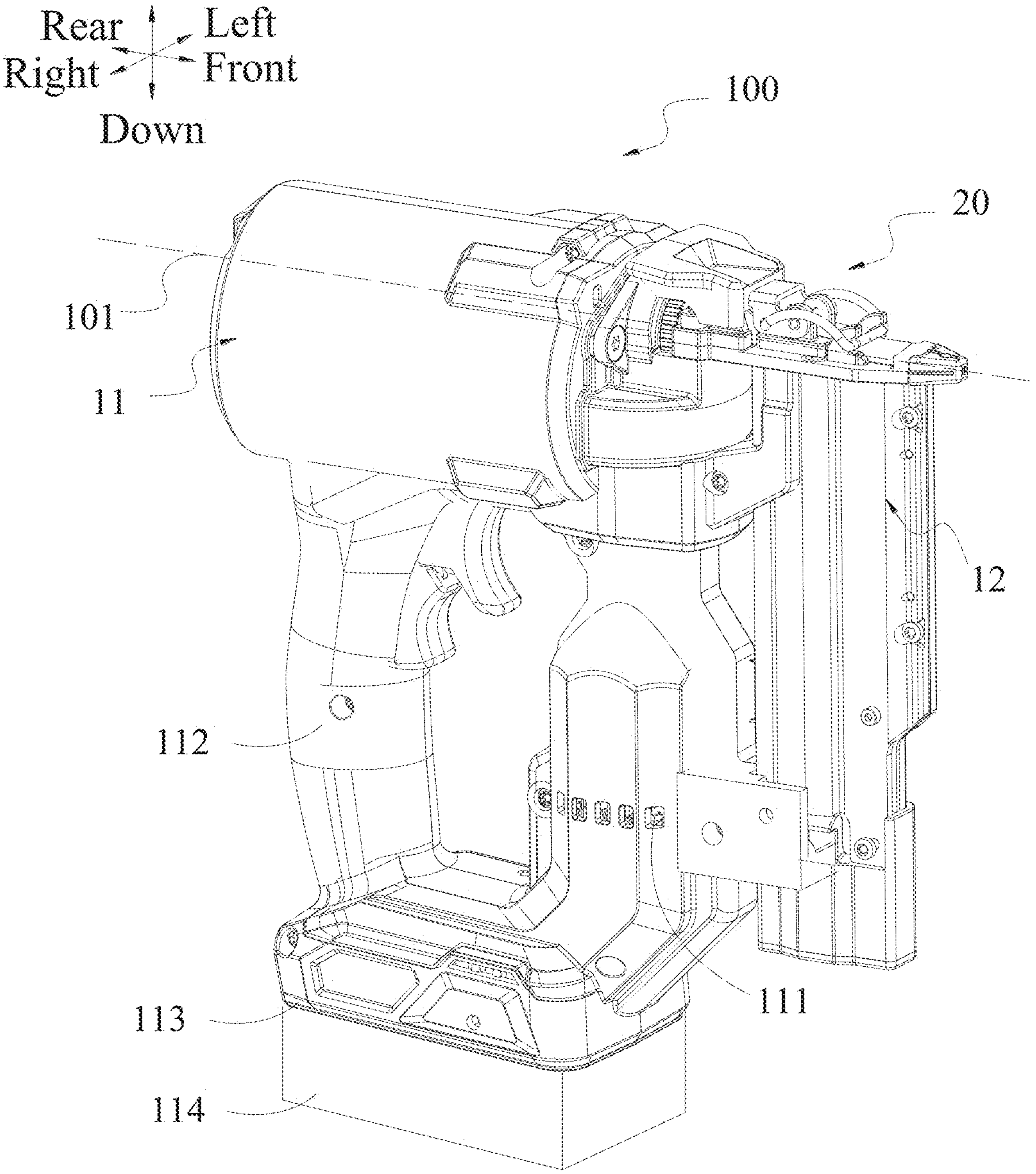
FIG. 1 is a perspective view of a nail gun according to an example of the present application.
Figure 2:
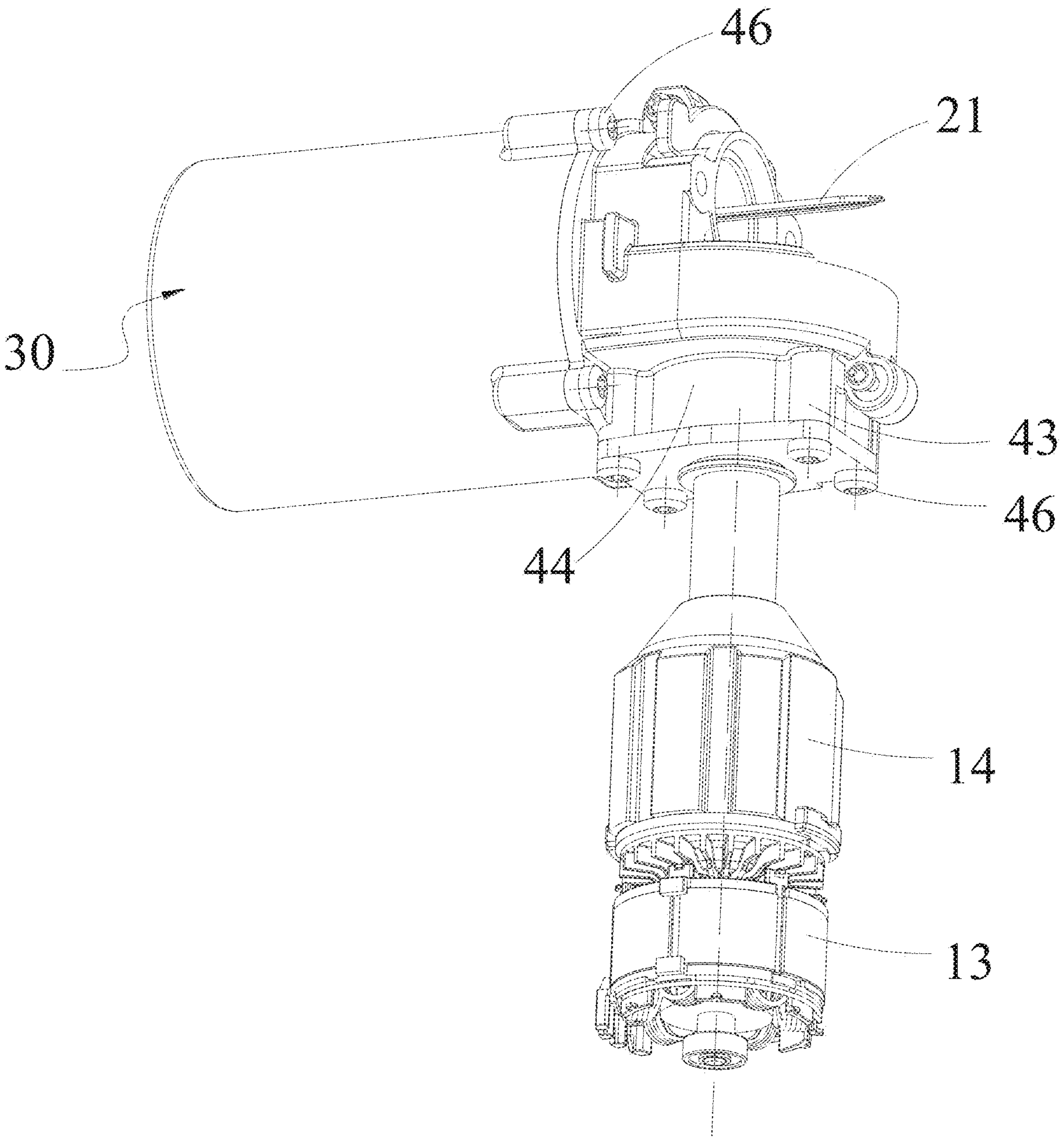
FIG. 2 is a perspective view of a cylinder assembly, a first end cap portion, a transmission assembly, and a motor of the nail gun of FIG. 1.
Figure 3:
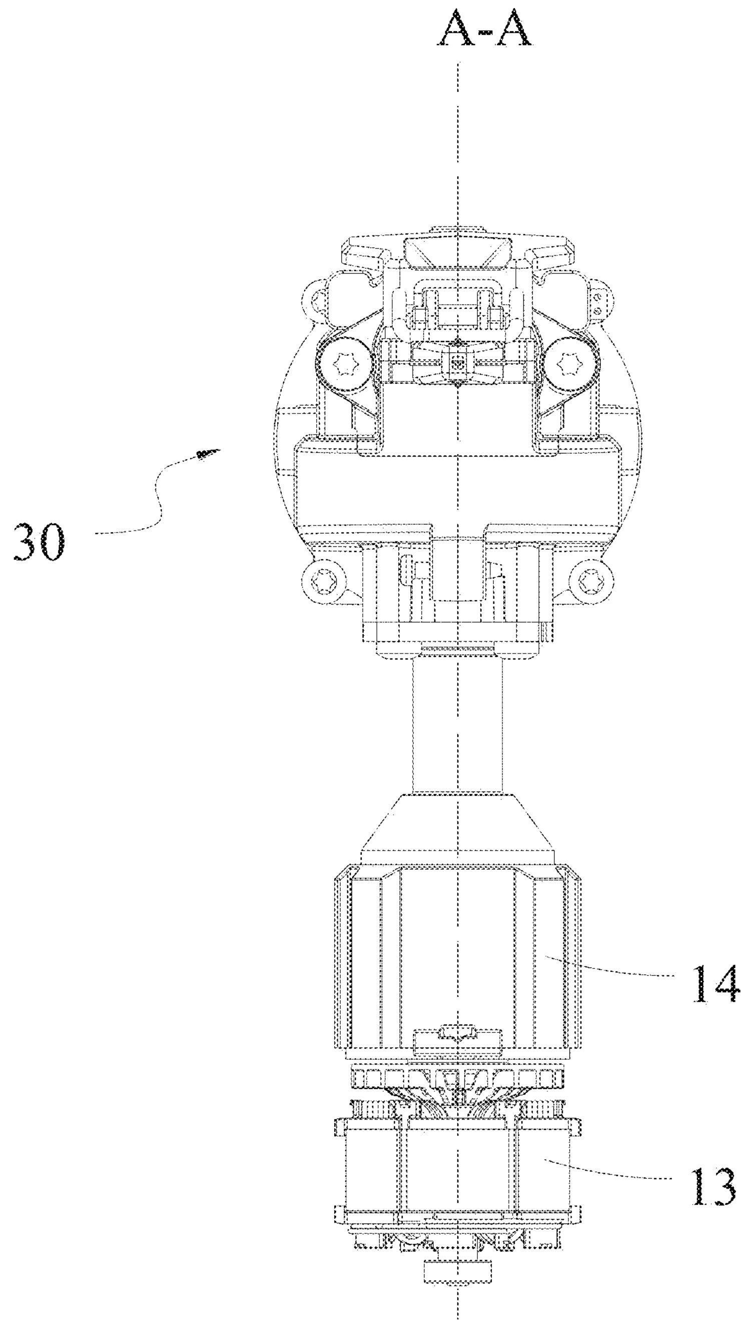
FIG. 3 is a front view of a cylinder assembly, a first end cap portion, a second end cap portion, a nail holder, a transmission assembly, and a motor of the nail gun of FIG. 1.

Before any examples of this application are explained in detail, it is to be understood that this application is not limited to its application to the structural details and the arrangement of components set forth in the following description or illustrated in the above drawings.

In this application, the terms "comprising", "including", "having" or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase "comprising a . . . " does not preclude the presence of additional identical elements in the process, method, article, or device comprising that element.

In this application, the term "and/or" is a kind of association relationship describing the relationship between associated objects, which means that there can be three kinds of relationships. For example, A and/or B can indicate that A exists alone, A and B exist simultaneously, and B exists alone. In addition, the character "/" in this application generally indicates that the contextual associated objects belong to an "and/or" relationship.

In this application, the terms "connection", "combination", "coupling" and "installation" may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, "connection" and "coupling" are not limited to physical or mechanical connections or couplings, and may include electrical connections or couplings.

In this application, it is to be understood by those skilled in the art that a relative term (such as "about", "approximately", and "substantially") used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, "substantially" when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms "up", "down", "left", "right", "front", and "rear" and other directional words are described based on the orientation or positional relationship shown in the drawings, and should not be understood as limitations to the examples of this application. In addition, in this context, it also needs to be understood that when it is mentioned that an element is connected "above" or "under" another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms "controller", "processor", "central processor", "CPU" and "MCU" are interchangeable. Where a unit "controller", "processor", "central processing", "CPU", or "MCU" is used to perform a specific function, the specific function may be implemented by a single aforementioned unit or a plurality of the aforementioned unit.

In this application, the term "device", "module" or "unit" may be implemented in the form of hardware or software to achieve specific functions.

In this application, the terms "computing", "judging", "controlling", "determining", "recognizing" and the like refer to the operations and processes of a computer system or similar electronic computing device (e.g., controller, processor, etc.).

As shown in FIG. 1, this example provides a nail gun 100. The nail gun 100 can apply a striking force to a fastener to shoot the fastener into a workpiece. The nail gun 100 includes a housing 11 and a magazine 12. An accommodation space 111 is formed on the inner side of the housing 11. The magazine 12 is configured to accommodate the fastener, the magazine 12 is disposed on the outer side of the housing 11, and at least part of the magazine 12 is located in front of the housing 11. The fastener in this example is a nail. A dimension of the nail may be 15 Ga, 16 Ga, 18 Ga, 23 Ga, 25 Ga, etc. and is not limited here. The housing 11 further forms a handle portion 112 that can be held by a user. A main switch is provided on the handle portion 112, and the user controls the start and stop of the nail gun 100 through the main switch. A power interface 113 is connected to an end of the handle portion 112 and used for connecting a direct current or alternating current power supply. In this example, the power interface 113 is connected to a battery pack 114.

As shown in FIGS. 1 to 5, the nail gun 100 further includes a firing assembly 20, a cylinder assembly 30, a motor 13, and a transmission assembly 14. The cylinder assembly 30, the motor 13, and the transmission assembly 14 are accommodated in the accommodation space 111. The firing assembly 20 is located at the front end of the housing 11 and partially accommodated in the accommodation space 111. The firing assembly 20 includes a firing pin 21 and a first piston 22. The firing pin 21 is mounted on the first piston 22, and the first piston 22 is basically located behind the firing pin 21. The firing pin 21 is configured to move along a first straight line 101 to output the striking force to the fastener. A direction of the first straight line 101 is a direction in which the fastener is driven into the workpiece. After the firing pin 21 completes one hit, a nail in the magazine 12 is supplied to the firing pin 21 and waits to be hit by the firing pin 21. The cylinder assembly 30 is supported by the housing 11. The cylinder assembly 30 includes a cylinder 31, the cylinder 31 forms a chamber 32. The cylinder assembly 30 further includes a second piston 33. The first piston 22 and the second piston 33 are accommodated in the chamber 32. In this example, the cylinder 31 includes a first cylinder 311 and a second cylinder 312. The second cylinder 312 is sleeved outside the first cylinder 311, and a gap exists between the second cylinder 312 and the first cylinder 311. The first cylinder 311 and the second cylinder 312 are basically cylindrical and extend along a front and rear direction. The first cylinder 311 forms a first chamber 313 to accommodate the first piston 22, and the second cylinder 312 forms a second chamber 314 to accommodate the second piston 33. The first piston 22 reciprocates in the first chamber 313. The second piston 33 includes a hole, and the first cylinder 311 penetrates through the hole so that the second piston 33 reciprocates in the second chamber 314. The transmission assembly 14 includes a gearset 141, a crank 142, and a connecting rod 143. The gearset 141 includes an output shaft 144. The crank 142 is sleeved on the output shaft 144. One end of the connecting rod 143 is connected to the crank 142, and the other end of the connecting rod 143 is connected to the second piston 33. The motor 13 drives the gearset 141 to rotate, and the gearset 141 drives the output shaft 144 to rotate. The crank 142 rotates around the output shaft 144 and drives the connecting rod 143 to drive the second piston 33 to reciprocate in the second cylinder 312.

As shown in FIGS. 2 to 9, a cylinder opening 34 is provided at the front end of the cylinder 31, and the firing pin 21 enters and exits the cylinder 31 through the cylinder opening 34. The cylinder assembly 30 further includes an end cap 40. The end cap 40 is connected to the front end of the cylinder 31. The end cap 40 includes a first end cap portion 41 and a second end cap portion 42. The first end cap portion 41 is connected to the housing 11. In some examples, the first end cap portion 41 may be directly connected to the cylinder 31. The first end cap portion 41 includes a support portion 43, a first accommodation portion 44, and a second accommodation portion 45. At least part of the second end cap portion 42, at least part of the first end cap portion 41, and at least part of the transmission assembly 14 are arranged in sequence from top to bottom. The second end cap portion 42 is basically aligned with the second accommodation portion 45 in an up and down direction. The second end cap portion 42 and the second accommodation portion 45, the first accommodation portion 44, the support portion 43, and a gearbox of the transmission assembly 14 are arranged in sequence from top to bottom. The support portion 43 is configured to support the transmission assembly 14. At least part of the support portion 43 is disposed below the second end cap portion 42. The support portion 43 is formed on the first accommodation portion 44 or integrally formed with the first accommodation portion 44. In this example, the support portion 43 is integrally formed with the first accommodation portion 44. The support portion 43 forms or is connected to a third accommodation portion 431 for accommodating the transmission assembly 14. In this example, the third accommodation portion 431 is fixedly mounted to the support portion 43 through a connector 46 such as a screw. Part of the output shaft 144 is located in the third accommodation portion 431 and meshes with the gearset 141, and part of the output shaft 144 is located in the first accommodation portion 44 and mates with the crank 142.

The first accommodation portion 44 is basically disposed below the first cylinder 311 and in front of the second cylinder 312. The first accommodation portion 44 is opened rearward, and the second cylinder 312 is opened forward so that the first accommodation portion 44 communicates with the second chamber 314. The connecting rod 143 spans from the first accommodation portion 44 to the second cylinder 312. When the motor 13 drives the connecting rod 143 to move, the connecting rod 143 drives the second piston 33 accommodated in the second cylinder 312 to reciprocate.

The second accommodation portion 45 is basically located in front of the first cylinder 311 and the second cylinder 312 and is sleeved on the front end of the first cylinder 311. The second accommodation portion 45 is opened rearward, and the first cylinder 311 is opened forward so that the second accommodation portion 45 communicates with the first chamber 313.

The first cylinder 311 includes an air leakage portion 315 and an air leakage hole 316, where the air leakage portion 315 is located at the front end of the first chamber. The air leakage hole 316 is used for discharging air in front of the first piston 22 to the atmosphere. One or more air leakage holes 316 may be provided, where the one or more air leakage holes 316 are circumferentially formed on the air leakage portion 315. In this example, the air leakage holes 316 are multiple circular holes. A one-way valve 317 is mounted at the air leakage hole 316, and the one-way valve 317 enables air to flow out of the first chamber 313 and not flow into the first chamber 313. The air leakage portion 315 is accommodated in the second accommodation portion 45 so that the second accommodation portion 45 communicates with the first chamber 313. The first cylinder 311 includes an air supply groove 318 through which atmospheric air flows into the second chamber 314. The first cylinder 311 includes an outer wall 319. One or more air supply grooves 318 may be provided, where the one or more air supply grooves 318 are circumferentially formed on the outer wall 319. In this example, the air supply groove 318 is strip-shaped and extends along the front and rear direction. The first end cap portion 41 is provided with a first opening 411 for the firing pin 21 to penetrate through, and the first opening 411 is located at the front end of the first end cap portion 41. As shown in FIGS. 8 to 11, cross sections of the first opening 411, the first cylinder 311, and the first piston 22 are basically circular. The centers of the cross sections of the first cylinder 311, the first piston 22, and the first opening 411 are basically located on the first straight line 101. The diameter of the first opening 411 is larger than the diameter of the first piston 22 so that the user can detach the firing pin 21 along with the first piston 22 through the first opening 411.

The second end cap portion 42 is movably connected to the first end cap portion 41. The second end cap portion 42 is basically located in front of the second accommodation portion 45 and above the first accommodation portion 44. The second end cap portion 42 is connected to the first opening 411. When at least part of the second end cap portion 42 moves away from the first end cap portion 41, the first opening 411 is exposed to allow the firing assembly 20 to be disengaged from the cylinder assembly 30. The at least part of the second end cap portion 42 moves away from the first end cap portion 41 in a manner of rotation, sliding, or movement. A maximum dimension of the second end cap portion 42 in the up and down direction is less than a maximum dimension of the first end cap portion 41 in the up and down direction, and a maximum dimension of the second end cap portion 42 in a left and right direction is less than a maximum dimension of the first end cap portion 41 in the left and right direction. The dimensions of the second end cap portion 42 are less than the dimensions of the first end cap portion 41, making it convenient for the user to detach the second end cap portion 42 from the first end cap portion 41.

Figure 12:
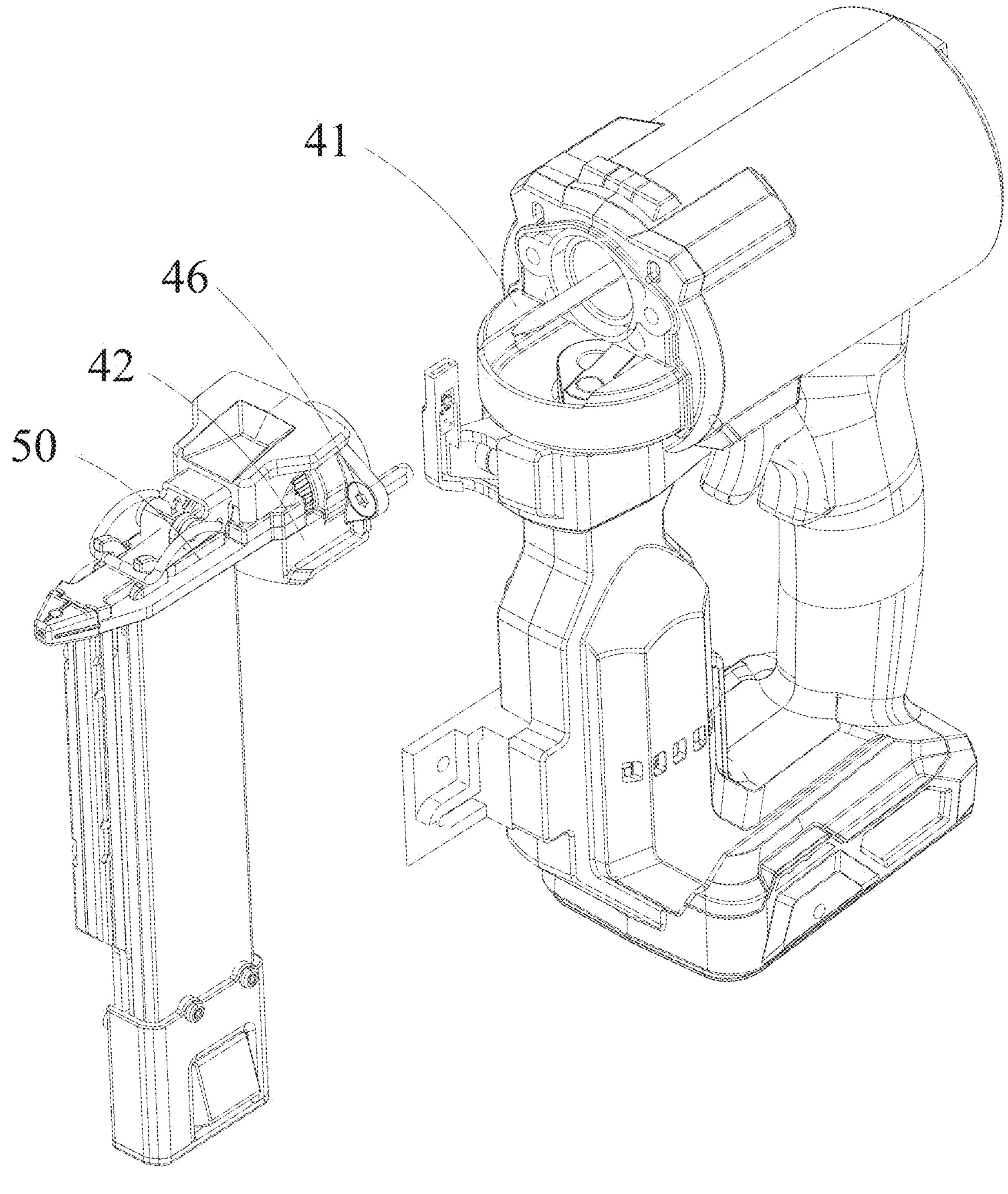
FIG. 12 is a schematic view of the nail gun of FIG. 1 with a second end cap portion, a nail holder, and a magazine detached from a first end cap portion.
Figure 13:
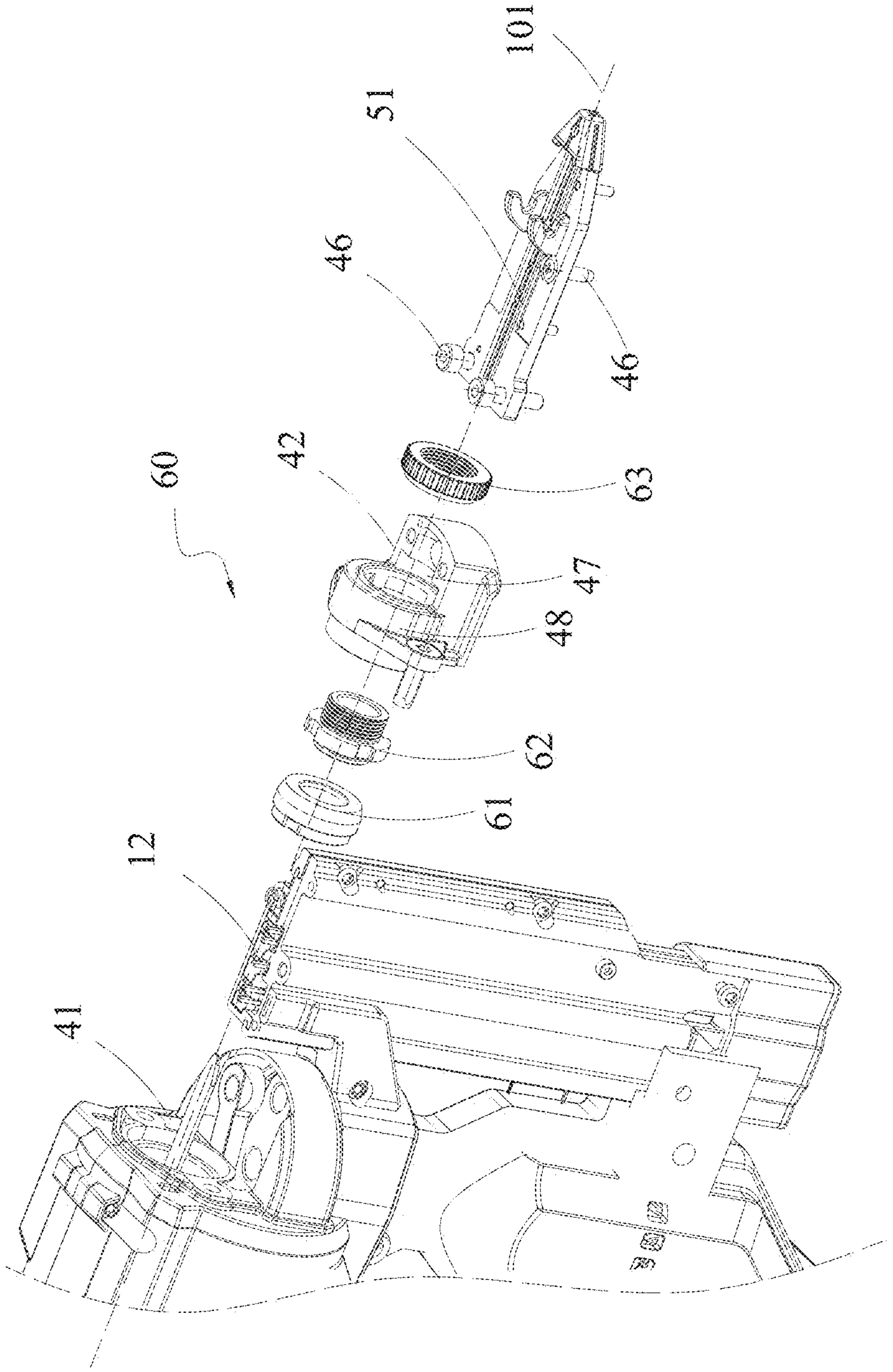
FIG. 13 is an exploded view of a depth adjustment device, a second end cap portion, and part of a nail holder of the nail gun of FIG. 1.

As shown in FIGS. 12 and 13, in this example, the second end cap portion 42 is detachably connected to the first end cap portion 41 through the connector 46. The connector 46 may be a screw, a snap, or a thread. The at least part of the second end cap portion 42 is located on a path along which the firing assembly 20 is disengaged from the cylinder assembly 30. When the at least part of the second end cap portion 42 is not moved away from the first end cap portion 41, the first opening 411 is hidden so that the firing assembly 20 cannot be disengaged from the cylinder assembly 30. When the at least part of the second end cap portion 42 moves away from the first end cap portion 41, the first opening 411 is exposed to allow the firing assembly 20 to be disengaged from the cylinder assembly 30. That is to say, before the user detaches the second end cap portion 42 from the first end cap portion 41, the firing assembly 20 cannot be disengaged from the cylinder assembly 30, and the user uses the nail gun 100 to drive the nail. When the user desires to replace the firing pin 21, the user detaches the second end cap portion 42 from the first end cap portion 41 so that the firing assembly 20 can be disengaged from the cylinder assembly 30. In this manner, the user can replace the firing pin 21 by simply detaching the second end cap portion 42, which is convenient and quick.

The nail gun 100 includes a nail holder 50. The nail holder 50 is provided with a guide rail 51, and the guide rail 51 extends along the first straight line 101. The guide rail 51 mates with the firing pin 21 to guide the firing pin 21 to move along the first straight line 101. The second end cap portion 42 supports at least part of the nail holder 50. The at least part of the nail holder 50 is mounted on the second end cap portion 42 through the connector 46, such as the screw. In this manner, the nail holder 50 is fixedly connected to the second end cap portion 42. When the second end cap portion 42 moves from the first end cap portion 41 and away from the first end cap portion 41, the nail holder 50 moves away from the first end cap portion 41 along with the second end cap portion 42. The nail holder 50 is located on the path along which the firing assembly 20 is disengaged from the cylinder assembly 30. The nail holder 50 is fixedly connected to the second end cap portion 42 so that when the user detaches the second end cap portion 42, the nail holder 50 is also detached, making it convenient for the user to quickly replace the firing pin 21 and quickly remount the detached parts.

The magazine 12 supports at least part of the nail holder 50. The at least part of the nail holder 50 is mounted on the magazine 12 through the connector 46, such as the screw. When the at least part of the second end cap portion 42 moves away from the first end cap portion 41, the magazine 12 moves away from the first end cap portion 41 along with the at least part of the second end cap portion 42. The magazine 12 is located on the path along which the firing assembly 20 is disengaged from the cylinder assembly 30. The magazine 12 is fixedly connected to the nail holder 50, that is, fixedly connected to the second end cap portion 42. In this manner, when the user detaches the second end cap portion 42, the nail holder 50 and the magazine 12 are also detached, making it convenient for the user to quickly replace the firing pin 21 and quickly remount the detached parts.

In some examples, the nail holder 50 is integrally formed with the second end cap portion 42 in this example, and the nail holder 50 and the second end cap portion 42 in this example are regarded as the second end cap portion 42 as a whole. In some examples, the nail holder 50 may be regarded as the second end cap portion 42. In some examples, the magazine 12 may be regarded as the second end cap portion 42. As long as the second end cap portion 42 is connected to the first opening 411 and when the user detaches the second end cap portion 42 from the first end cap portion 41, the firing assembly 20 can be disengaged from the cylinder assembly 30, a form of the second end cap portion 42 is not limited.

Figure 7:
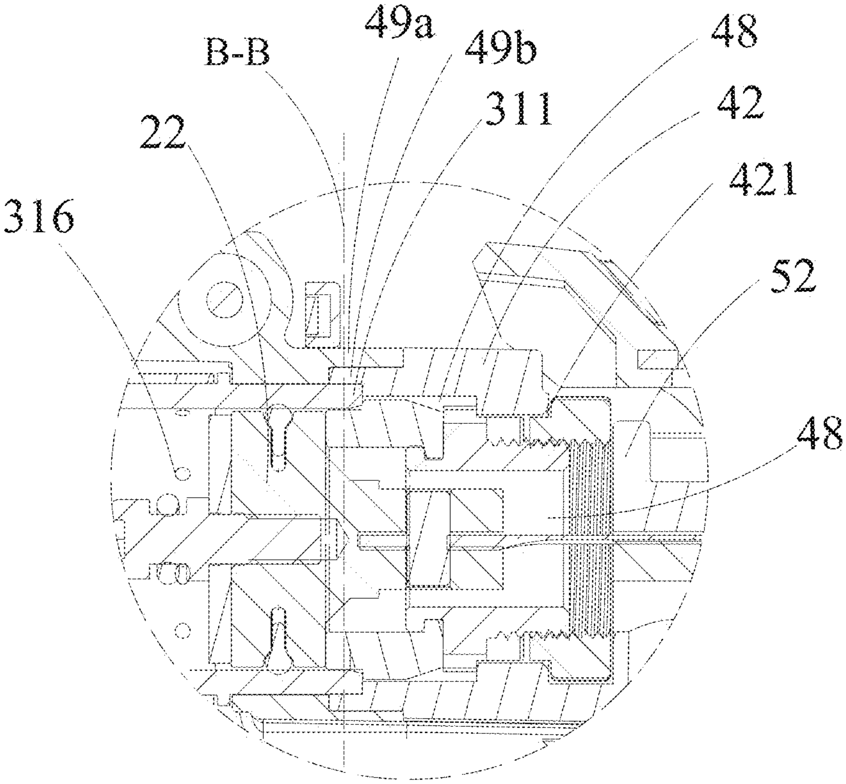
FIG. 7 is a partial enlarged view of the nail gun of FIG. 5.
Figure 8:
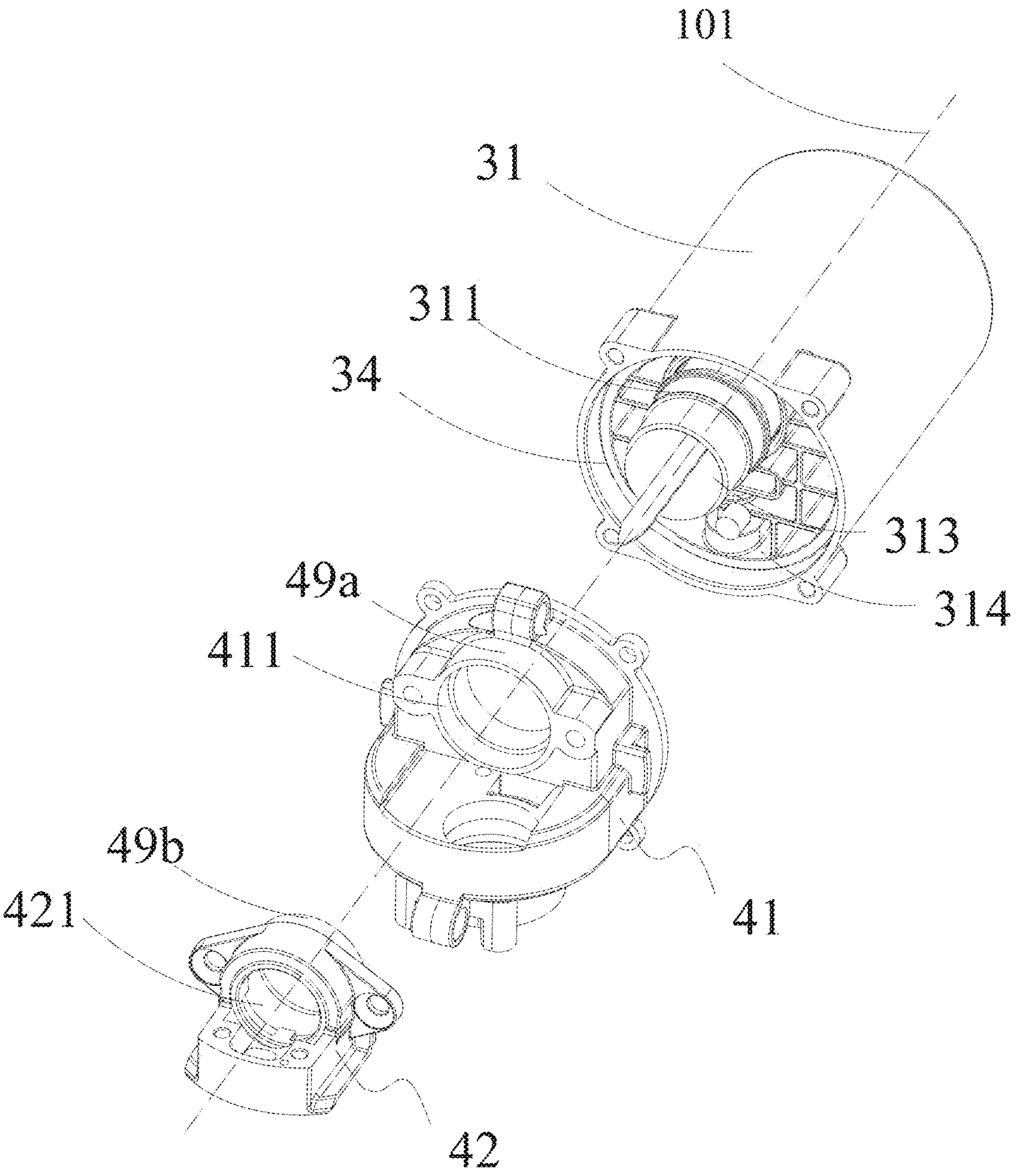
FIG. 8 is an exploded view of a cylinder assembly, part of a first end cap portion, and a second end cap portion of the nail gun of FIG. 1 from an angle.
Figure 9:
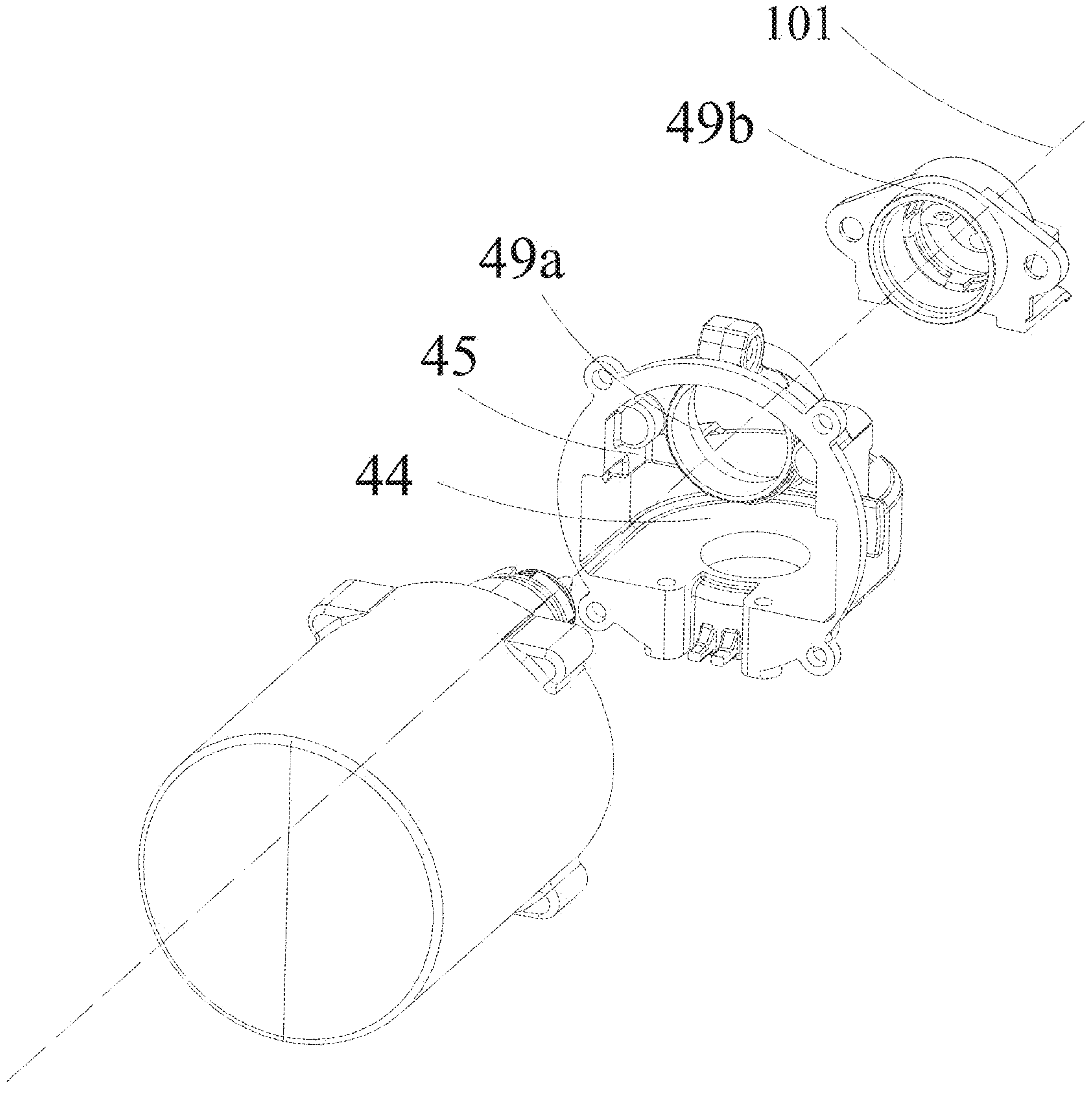
FIG. 9 is an exploded view of a cylinder assembly, part of a first end cap portion, and a second end cap portion of the nail gun of FIG. 1 from another angle.
Figure 10:
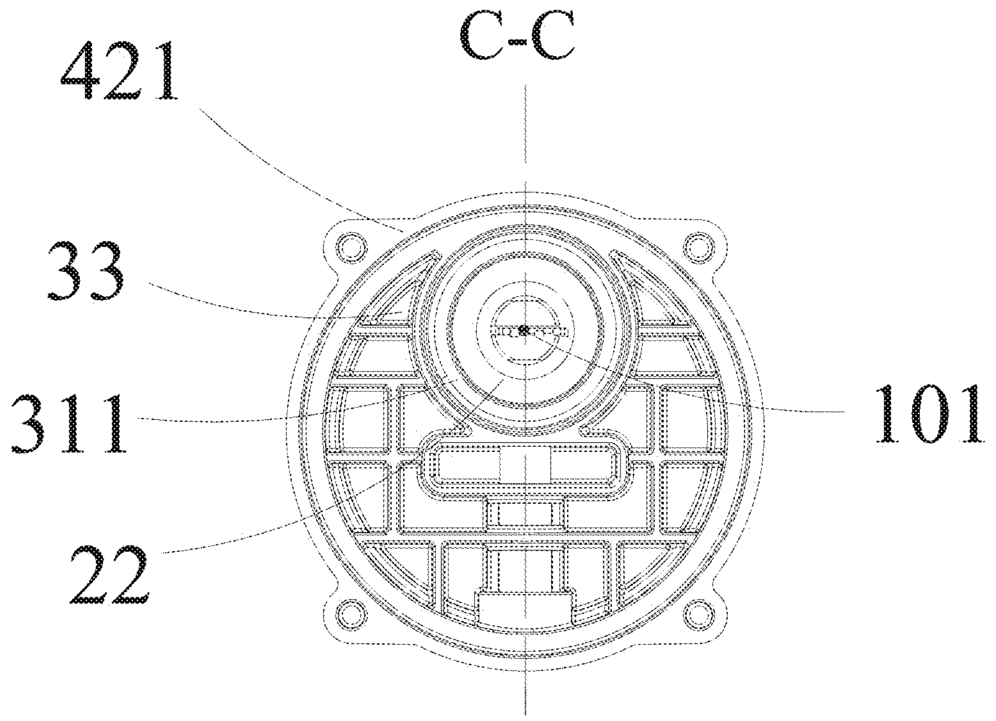
FIG. 10 is a front view of a cylinder assembly and a firing assembly of the nail gun of FIG. 1.
Figure 11:
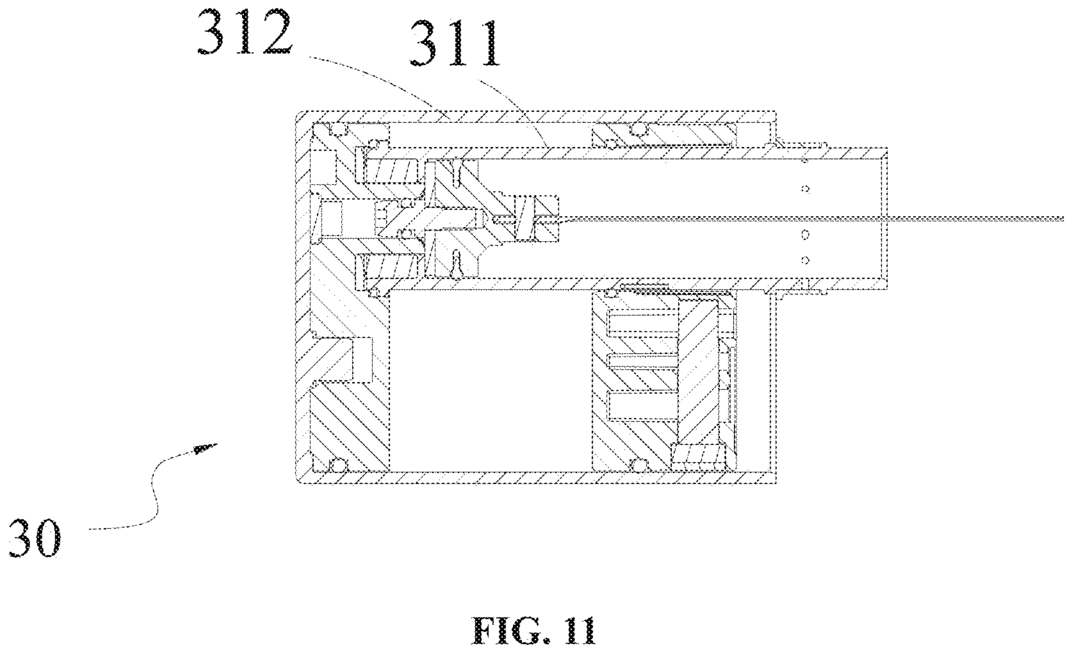
FIG. 11 is a sectional view of the cylinder assembly and the firing assembly of the nail gun of FIG. 10 along C-C.

As shown in FIGS. 8 to 11, the second end cap portion 42 is provided with a second opening 421 for the firing pin 21 to penetrate through, and the second opening 421 is located at the front end of the second end cap portion 42. The center of a cross section of the second opening 421 is basically located on the first straight line 101. The diameter of the second opening 421 is smaller than the diameter of the first piston 22. In this manner, when the second end cap portion 42 is not detached, the second opening 421 prevents the user from detaching the firing pin 21 along with the first piston 22 through the second opening 421. The first end cap portion 41 includes a first centering portion 49*a* defining the first opening 411, and the first centering portion 49*a* is basically cylindrical. The second end cap portion 42 includes a second centering portion 49*b*. The second centering portion 49*b* is in the shape of a hollow cylinder and extends rearward from the second end cap portion 42 into the first centering portion 49*a*. In this manner, it is convenient to position the centers of the first end cap portion 41 and the second end cap portion 42 on the first straight line 101 during assembly. As shown in FIG. 7, on a cross section B-B, cross sections of the first centering portion 49*a*, the second centering portion 49*b*, and the first cylinder 311 are all circular, and the centers of the cross sections are basically located on the first straight line 101, achieving a good centering effect, preventing the firing assembly 20 from shaking, and achieving stable assembly of parts.

Figure 4:
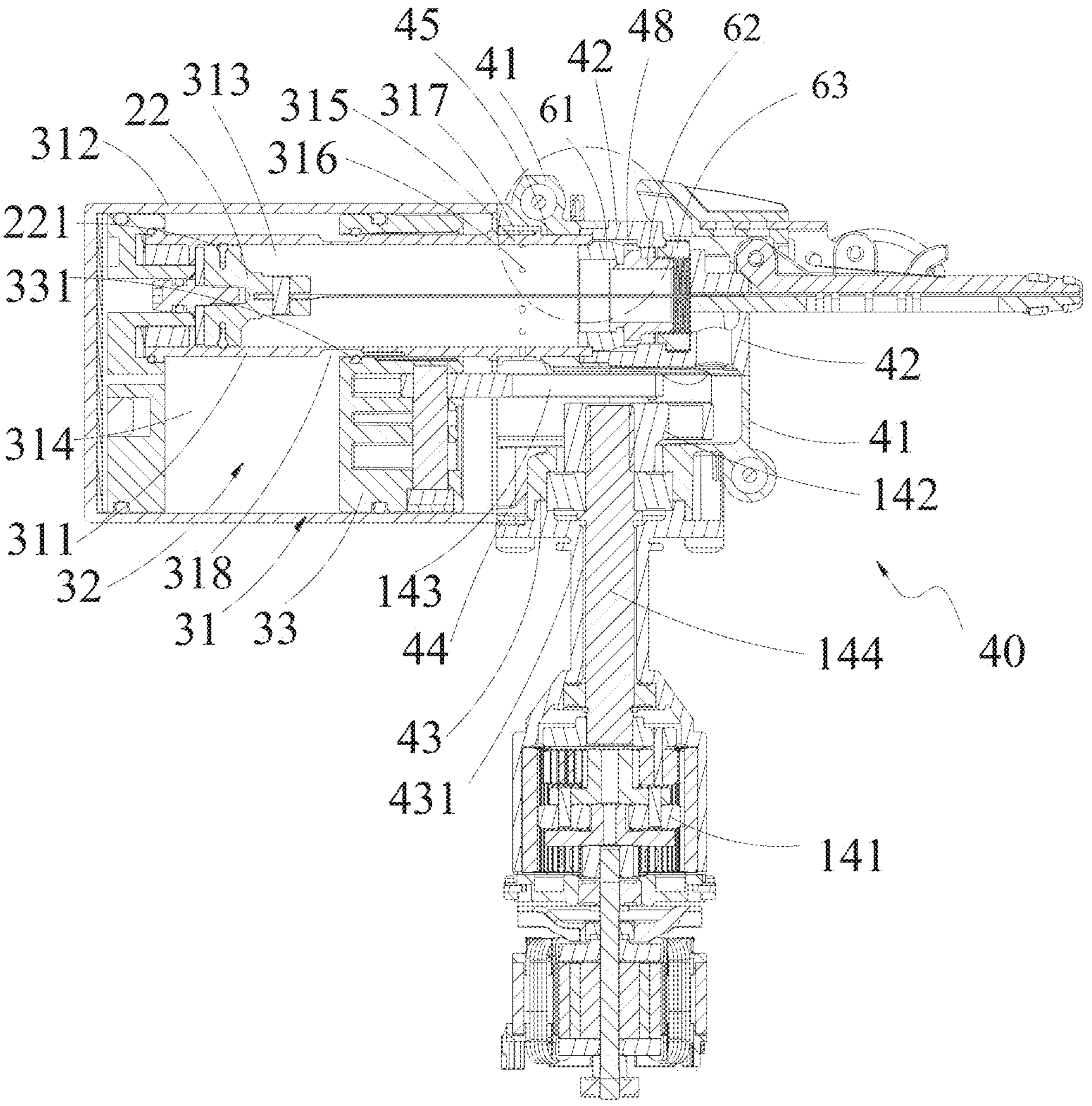
FIG. 4 is a sectional view of the nail gun of FIG. 3 along A-A at an instant.

As shown in FIGS. 4 and 13, the nail gun 100 further includes a depth adjustment device 60, and the depth adjustment device 60 adjusts a stroke length of the first piston 22 in the first cylinder 311. The depth adjustment device 60 includes a buffer 61, an intermediate member 62, and an operating member 63. The operating member 63 is operated by the user to adjust the nailing depth of the nail gun 100. The second end cap portion 42 includes an adjustment portion 47 which is an arc-shaped groove. The operating member 63 is in the shape of a hollow cylinder, and the cylinder extends along the front and rear direction. Anti-slip strips are provided on a circumferential surface of the cylinder to increase the friction between a finger of the user and the operating member 63. The second end cap portion 42 includes a fourth accommodation portion 48. The operating member 63 is rotatably mounted to the adjustment portion 47 and abuts against the fourth accommodation portion 48. When the user rotates the operating member 63, the circumferential surface of the operating member 63 moves along the arc-shaped groove of the adjustment portion 47, and the position of the operating member 63 in the front and rear direction remains unchanged. A thread is formed on the inner ring of the operating member 63. The intermediate member 62 is located between the buffer 61 and the operating member 63. An end of the intermediate member 62 facing the operating member 63 is formed with a thread to mate with the operating member 63, and an end of the intermediate member 62 facing the buffer 61 is fixedly connected to the buffer 61. At least part of the intermediate member 62 and at least part of the buffer 61 are slidably accommodated in the fourth accommodation portion 48, and at least part of the intermediate member 62 and at least part of the buffer 61 are accommodated in the front end of the first chamber 313. When the user rotates the operating member 63, the operating member 63 basically rotates at its original position around the first straight line 101, and the intermediate member 62 threadedly mates with the operating member 63. In this manner, the operating member 63 drives the intermediate member 62 and the buffer 61 to move, and the rotation of the operating member 63 is converted into the movement of the intermediate member 62 and the buffer 61 along an axial direction of the first chamber 313. The buffer 61 may be a rubber pad or made of any buffer material. When the first piston 22 moves to the front end of the first chamber 313, the first piston 22 abuts against the buffer 61, and the buffer 61 prevents the first piston 22 from continuing to move forward. When the position of the buffer 61 changes, an end position of the reciprocating motion of the first piston 22 changes, and thus the depth adjustment device 60 limits the length of a reciprocating stroke of the first piston 22 in the first chamber 313, that is, changes the nailing depth of the nail gun 100. The rotation of the operating member 63 is converted into the axial movement of the buffer 61. In this manner, the nail gun 100 is compact in structure, pleasing in appearance, and convenient for the user to operate.

Figure 5:
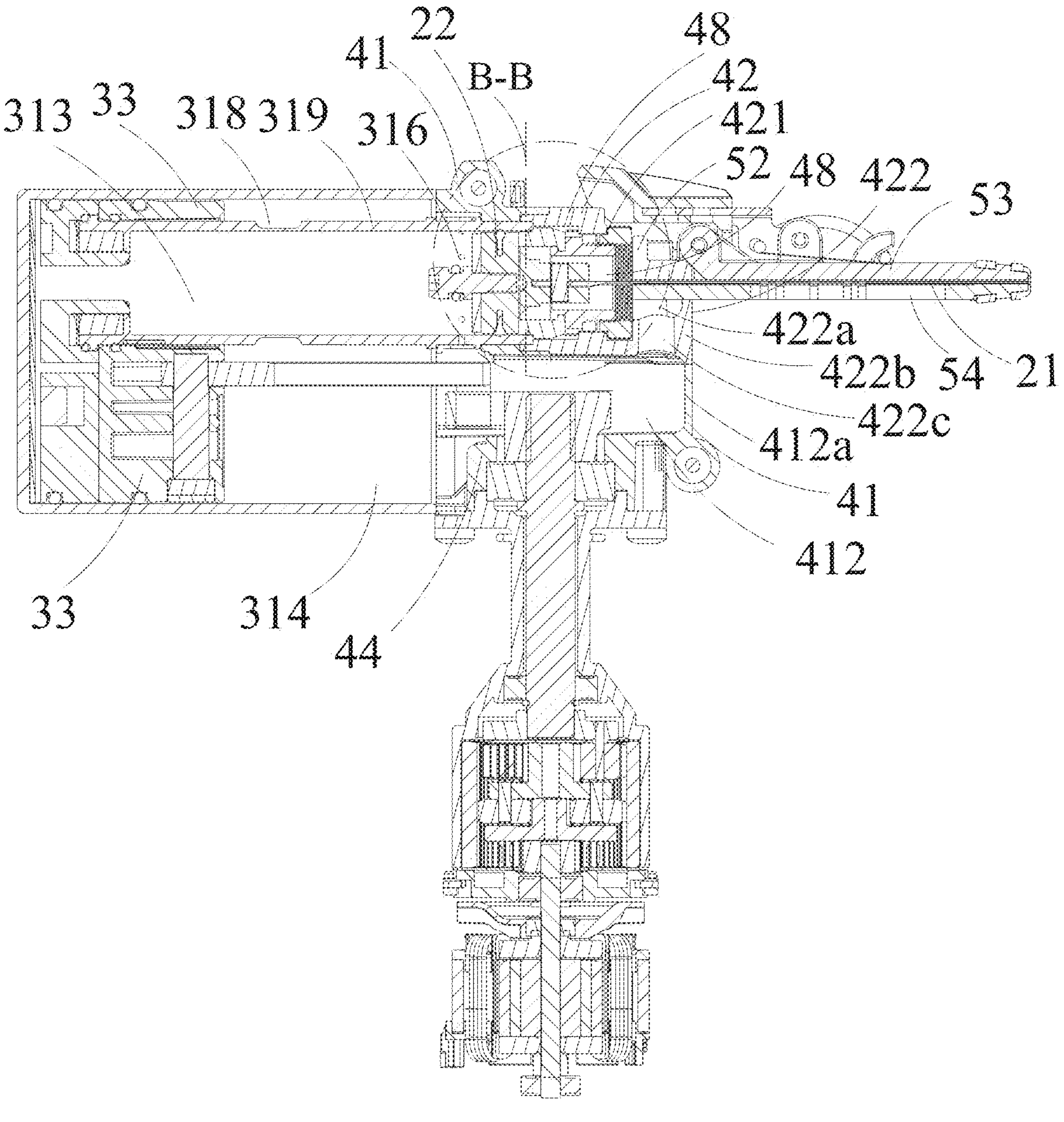
FIG. 5 is a sectional view of the nail gun of FIG. 3 along A-A at another instant.

As shown in FIG. 5, the nail holder 50 includes a stop portion 52, and the stop portion 52 extends basically along the up and down direction. When the nail holder 50 is mounted to the second end cap portion 42, the stop portion 52 completely blocks the second opening 421, the fourth accommodation portion 48 becomes a relatively closed space, and air is difficult to discharge forward and upward from the fourth accommodation portion 48. The nail holder 50 includes an upper nail holder 53 and a lower nail holder 54. The upper nail holder 53 is disposed above the firing pin 21, and the lower nail holder 54 is disposed below the firing pin 21. The rear ends of the upper nail holder 53 and the lower nail holder 54 jointly constitute the stop portion 52. The end cap includes a ventilation portion. The first end cap portion 41 includes a first ventilation portion 412, and the second end cap portion 42 includes a second ventilation portion 422. The first ventilation portion 412 and the second ventilation portion 422 jointly constitute the ventilation portion. The second ventilation portion 422 includes a recessed portion 422*a* and a second end face 422*b* extending basically along the up and down direction. The second end face 422*b* abuts against the lower nail holder 54, and the recessed portion 422*a* is located on the inner side of the second end face 422*b* and is recessed downward. The second ventilation portion 422 includes one or more ventilation holes 422*c*, and the one or more ventilation holes 422*c* are at least partially formed on the recessed portion 422*a* so that the fourth accommodation portion 48 communicates with the second ventilation portion 422 through the one or more ventilation holes 422*c*. The first ventilation portion 412 is opened upward and includes a first end face 412*a* extending basically along the up and down direction. The first end face 412*a* is located on the outer side of the first ventilation portion 412 and abuts against the second end face 422*b*. The first end face 412*a* and the second end face 422*b* are basically arc-shaped so that the first end face 412*a* and the second end face 422*b* match in shape, and the first end cap portion 41 and the second end cap portion 42 mate with each other more stably. The second ventilation portion 422 includes the one or more ventilation holes 422*c*, and the first ventilation portion 412 is opened upward so that the second ventilation portion 422 communicates with the first ventilation portion 412. The first chamber 313, the fourth accommodation portion 48, the second ventilation portion 422, the first ventilation portion 412, the first accommodation portion 44, and the second chamber 314 communicate in sequence. In this manner, when the first piston 22 moves towards the end cap 40, at least part of air in the first chamber 313 flows towards the second chamber 314, and the first piston 22 moves towards the end cap 40 with smaller resistance. When the first piston 22 moves towards the end cap 40, that is, forward, part of the air is leaked through the air leakage holes 316 to the atmosphere, and part of the air flows towards the second chamber 314 to assist the second piston 33 in moving rearward. The first piston 22 moves forward and the second piston 33 moves rearward faster, reducing an energy loss, achieving a high air circulation utilization, and improving the nailing efficiency.

Figure 14:
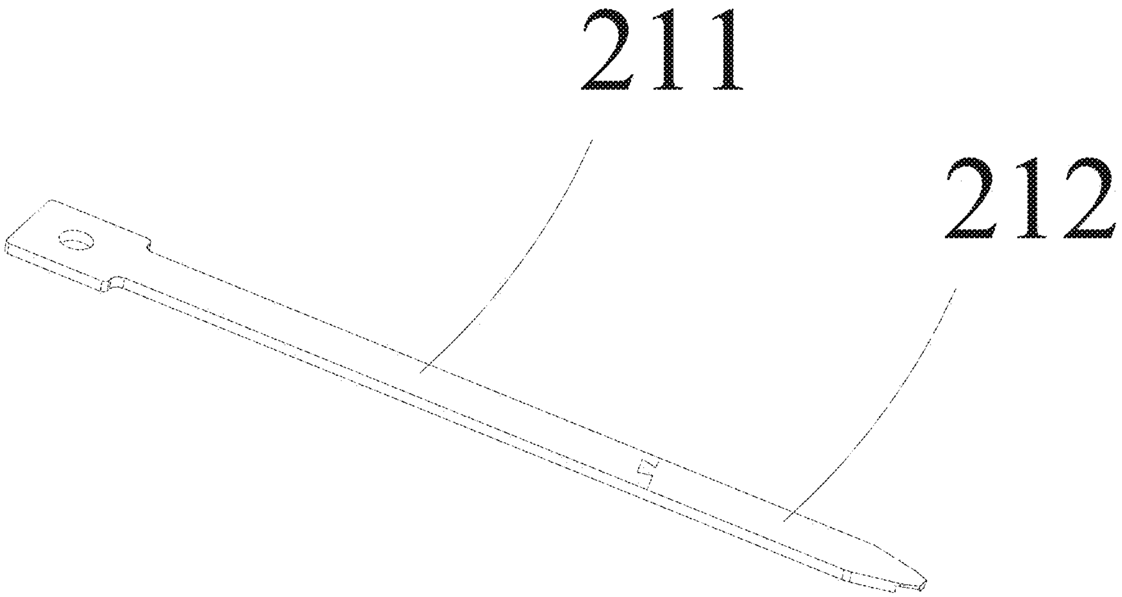
FIG. 14 is a perspective view of a firing pin of the nail gun of FIG. 1.

As shown in FIG. 14, the firing pin 21 includes a firing pin body 211 and a firing pin head 212, the firing pin head 212 is located at an end of the firing pin body 211 facing away from the first piston 22, and the firing pin head 212 is detachably connected to the firing pin body 211. The firing pin head 212 mates with the firing pin body 211 through a dovetail slot or in other forms so that when the firing pin head 212 is worn, the user can quickly replace the firing pin head 212.

The working principle of a double-cylinder nail gun 100 in this example is described below. The working principle of the double-cylinder nail gun 100 in this example is basically the same as that of an existing double-cylinder nail gun 100, and a difference lies in that an air supply hole of the nail gun 100 in this example is disposed on the first cylinder, and the air supply hole is the air supply groove 318. For ease of reading, only the difference between this example and the existing art is described below.

Figure 6:
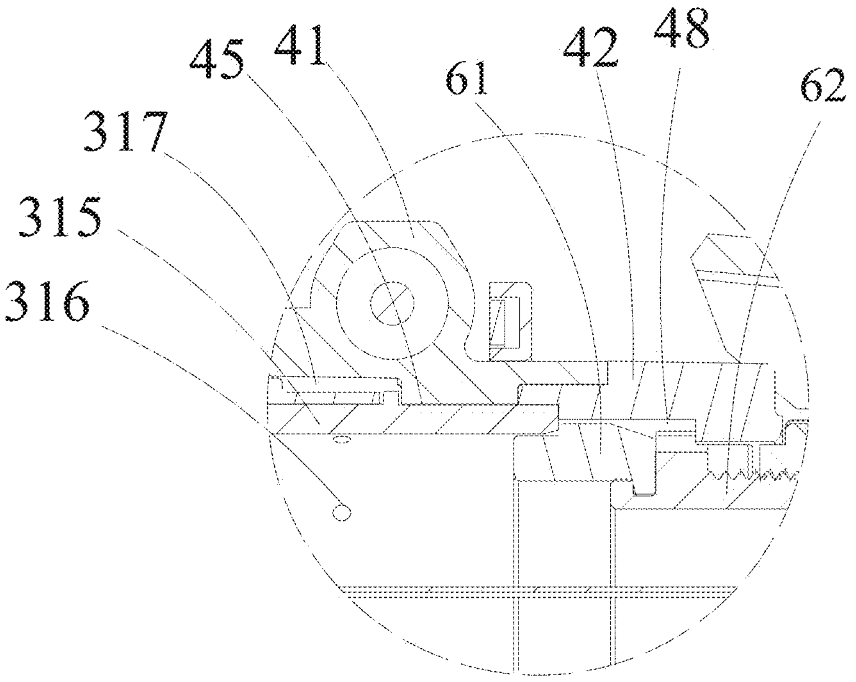
FIG. 6 is a partial enlarged view of the nail gun of FIG. 4.

As shown in FIGS. 4 to 7, the first piston 22 includes a first sealing ring 221, and the second piston 33 includes a second sealing ring 331. The first sealing ring 221 and the second sealing ring 331 may mate closely with the first cylinder 311 and the second cylinder 312 respectively so that the first chamber 313 and the second chamber 314 can be isolated into sealed spaces. The rear end of the first cylinder mates magnetically with the rear end of the first piston 22. The first cylinder is provided with the air supply groove 318. When the second sealing ring 331 is located in front of the air supply groove 318, the atmosphere communicates with the second chamber 314 through a gap on the housing 11. The first piston 22 is attracted to the rear end of the first cylinder. As shown in FIGS. 4 and 6, the connecting rod 143 drives the second piston 33 to move rearward, and the sealing ring is moving past the air supply groove 318. After the sealing ring moves past the air supply groove 318, the atmospheric pressure in the rear of the second chamber 314 gradually increases as the second piston 33 moves rearward. The cylinder includes a rear passage. The atmospheric pressure behind the second piston 33 is applied to the rear of the first piston 22 through the rear passage. When the atmospheric pressure behind the second piston 33 is greater than or equal to a magnetic force between the rear end of the first piston 22 and the rear end of the first cylinder, the first piston 22 moves forward. Part of air in front of the first piston 22 is discharged to the front of the second piston 33 through the ventilation portion, and part of the air in front of the first piston 22 is discharged to the atmosphere. As shown in FIG. 5, the first piston 22 moves past the air leakage holes 316, and air behind the first piston 22 and air behind the second piston 33 are both discharged to the atmosphere. When the first piston 22 moves to the most front end to which the first piston 22 can move, the second piston 33 moves to the most rear end to which the second piston 33 can move, and the nail gun 100 drives the nail. Then, the connecting rod 143 drives the second piston 33 to move forward. Since the one-way valve 317 does not allow air to enter the first chamber 313 from the atmosphere, negative pressure is generated behind the first piston 22 and behind the second piston 33. The first piston 22 moves rearward until the rear end of the first piston 22 mates magnetically with the rear end of the first cylinder. When the second sealing ring 331 moves forward with the second piston 33 and past the air supply groove 318 again, air in the atmosphere enters the cylinder again. When the second sealing ring 331 is located in front of the air supply groove 318 again, one cycle is completed.

The preceding examples illustrate the basic principles and features of the present application and are not to limit the present application. Various changes and variations can be made to the present application without departing from the spirit and scope of the present application, and such changes and variations are within the scope of the present application. The scope of the present application is defined by the appended claims and their equivalents.

The basic principles, main features, and advantages of this application are shown and described above. It is to be understood by those skilled in the art that the aforementioned examples do not limit the present application in any form, and all technical solutions obtained through equivalent substitutions or equivalent transformations fall within the scope of the present application.

What is claimed is:

1. A nail gun, comprising:

a firing assembly comprising a firing pin configured to strike a fastener and a first piston for mounting the firing pin;

a cylinder assembly comprising a second piston, a cylinder that forms a chamber configured to accommodate the first piston and the second piston, and an end cap connected to a front end of the cylinder;

a housing configured to support the cylinder assembly;

a motor disposed in the housing; and a transmission assembly configured to drive the second piston to move in the cylinder;

wherein the end cap comprises a first end cap portion connected to the housing; a support portion for supporting the transmission assembly; and a second end cap portion movably connected to the first end cap portion, the first end cap portion is provided with a first opening, the second end cap portion is connected to the first end cap portion adjacent to the first opening, and the first opening is exposed to allow the firing pin and the first piston to be disengaged from the first opening when at least part of the second end cap portion moves away from the first end cap portion and the first end is not removed.

2. The nail gun of claim 1, further comprising a connector for detachably connecting the second end cap portion to the first end cap portion.

3. The nail gun of claim 1, further comprising a nail holder for guiding the firing pin to move along a first straight line, wherein the second end cap portion supports at least part of the nail holder, and the nail holder moves away from the first end cap portion along with the at least part of the second end cap portion when the at least part of the second end cap portion moves away from the first end cap portion.

4. The nail gun of claim 3, further comprising a magazine for accommodating the fastener, wherein the magazine supports at least part of the nail holder, and the magazine moves away from the first end cap portion along with the at least part of the second end cap portion when the at least part of the second end cap portion moves away from the first end cap portion.

5. The nail gun of claim 1, wherein the firing pin moves basically along a first straight line, a cross section of the first opening is basically circular, a cross section of the first piston is basically circular, and a center of the cross section of the first piston and a center of the cross section of the first opening are basically located on the first straight line.

6. The nail gun of claim 5, wherein the second end cap portion is provided with a second opening, a cross section of the second opening is basically circular, and a center of the cross section of the second opening is basically located on the first straight line.

7. The nail gun of claim 1, wherein the chamber comprises a first chamber for the first piston to reciprocate in and a second chamber for the second piston to reciprocate in.

8. The nail gun of claim 7, wherein the end cap comprises a ventilation portion, and the first chamber, the ventilation portion, and the second chamber communicate in sequence so that at least part of air in the first chamber flows towards the second chamber when the first piston moves towards the end cap.

9. The nail gun of claim 7, further comprising a depth adjustment device configured to adjust a stroke length of the first piston, the depth adjusting device comprising a buffer and an operating member, wherein the buffer moves along an axial direction of the first chamber when the operating member is rotated.

10. The nail gun of claim 8, wherein the first end cap portion comprises a first ventilation portion, the second end cap portion comprises a second ventilation portion, and the first ventilation portion and the second ventilation portion jointly constitute the ventilation portion.

11. The nail gun of claim 1, wherein the firing pin comprises a firing pin body and a firing pin head, the firing pin head is located at an end of the firing pin body facing away from the first piston, and the firing pin head is detachably connected to the firing pin body.

12. The nail gun of claim 1, wherein at least part of the second end cap portion, at least part of the first end cap portion, and at least part of the transmission assembly are arranged in sequence along a straight line.

13. The nail gun of claim 1, wherein the first end cap portion comprises a first accommodation portion for accommodating at least part of the transmission assembly.

14. The nail gun of claim 1, wherein a maximum dimension of the second end cap portion in first direction is less than a maximum dimension of the first end cap portion in the first direction.

15. The nail gun of claim 1, wherein a maximum dimension of the second end cap portion in a second direction is less than a maximum dimension of the first end cap portion in the second direction.

16. A nail gun, comprising:

a firing assembly comprising a firing pin configured to strike a fastener and a first piston for mounting the firing pin;

a cylinder assembly comprising a second piston, a cylinder that forms a chamber configured to accommodate the first piston and the second piston, and an end cap connected to a front end of the cylinder; and a transmission assembly configured to drive the second piston to move in the cylinder;

wherein the end cap comprises a first end cap portion for supporting the transmission assembly and a second end cap portion movably connected to the first end cap portion, the first end cap portion is provided with a first opening, the second end cap portion is connected to the first opening, and, when at least part of the second end cap portion moves away from the first end cap portion, the first opening is exposed to allow the firing pin and the first piston to be disengaged from the cylinder assembly.

17. The nail gun of claim 16, further comprising a connector for detachably connecting the second end cap portion to the first end cap portion.

18. The nail gun of claim 16, further comprising a nail holder for guiding the firing pin to move along a first straight line, wherein the second end cap portion supports at least part of the nail holder, and the nail holder moves away from the first end cap portion along with the at least part of the second end cap portion when the at least part of the second end cap portion moves away from the first end cap portion.

19. The nail gun of claim 16, wherein at least part of the second end cap portion, at least part of the first end cap portion, and at least part of the transmission assembly are arranged in sequence along a straight line.

* * * * *